United States Patent [19]

Sakakibara et al.

[11] Patent Number: 4,515,922

[45] Date of Patent: May 7, 1985

[54] RUBBER COMPOSITIONS

[75] Inventors: Mitsuhiko Sakakibara; Masao Yoshizawa, both of Yokkaichi; Masaki Ogawa, Kodaira; Yasushi Hirata, Higashimurayama; Shigeru Tomihira, Kodaira, all of Japan

[73] Assignees: Bridgestone Tire Company Limited; Japan Synthetic Rubber Co., Ltd., both of Tokyo, Japan

[21] Appl. No.: 574,427

[22] Filed: Jan. 27, 1984

[30] Foreign Application Priority Data

Jan. 31, 1983 [JP] Japan .................................. 58-12886

[51] Int. Cl.³ .................... C08L 9/00; C08L 47/00; C08L 53/00
[52] U.S. Cl. ....................................... 525/99; 525/95; 525/98; 525/236; 525/237
[58] Field of Search .................. 525/236, 95, 98, 237, 525/99

[56] References Cited

U.S. PATENT DOCUMENTS 4,107,236  8/1978  Naylor et al. ...................... 525/122
4,370,448  1/1983  Leland ................................ 525/236

Primary Examiner—Jacob Ziegler
Attorney, Agent, or Firm—Sughrue, Mion, Zinn, Macpeak and Seas

[57] ABSTRACT

A rubber composition having improved wet skid resistance and rolling resistance is disclosed, which comprises (A) 10–90% by weight of polybutadiene rubber having a content of cis-1,4-bond at least 80% and an average chain length of cis-1,4-bond of not less than 110, and (B) 10–90% by weight of random styrene-butadiene copolymer rubber obtained by copolymerization in the presence of an organic metal catalyst and having a content of bound styrene of not more than 40% by weight and a content of 1,2-bond in total butadiene unit of 30–95%.

9 Claims, No Drawings

RUBBER COMPOSITIONS

BACKGROUND OF THE INVENTION

1. Field of the Invention

This invention relates to novel rubber compositions, and more particularly to a rubber composition having improved wet skid resistance and rolling resistance suitable for use in tire tread.

2. Description of the Prior Art

Lately, it has seriously been taken as rubber performances for automobile tire tread to improve the wet skid resistance, heat build-up and durability in relation to running stability as well as the rolling resistance or hysteresis loss in relation to the fuel consumption.

Heretofore, it was difficult to satisfy the above performances with a single rubber, so that blends of different rubbers have been proposed. For example, rubber compositions each containing a blend of styrene-butadiene copolymer rubber and polybutadiene rubber have widely been used as a tread rubber for automobile tire. In these rubber compositions, however, the rolling resistance (hysteresis loss) was not necessarily low and also the wet skid resistance was not sufficient, because there were required such conflict conditions that a substance having a low glass transition temperature was used as a means for improving the rolling resistance, while a resin or the like having a high glass transition temperature was used as a means for improving the wet skid resistance. Furthermore, they had a problem that compatibility and dynamic properties, particularly heat build-up lowered considerably.

Therefore, it was difficult to improve the wet skid resistance without damaging the rolling resistance.

SUMMARY OF THE INVENTION

The inventors have made various investigation in order to satisfy the above severe requirements, which have never been achieved in the conventional rubber blends, and found that in a rubber composition containing 10–90% by weight of polybutadiene rubber with a specific structure, the hysteresis loss is very small and the wet skid resistance is improved, and as a result, the invention has been accomplished.

According to the invention, there is the provision of a rubber composition comprising (A) 10–90% by weight of polybutadiene rubber having a content of cis-1,4-bond of at least 80% and an average chain length of cis-1,4-bond of not less than 110, and (B) 10–90% by weight of random styrene-butadiene copolymer rubber obtained by copolymerization in the presence of an organometallic catalyst and having a content of bound styrene of not more than 40% by weight and a content of 1,2-bond in total butadiene unit of 30–95%.

DETAILED DESCRIPTION OF THE INVENTION

In the polybutadiene rubber according to the invention, the content of cis-1,4-bond is at least 80% and the average chain length of 1,4-bond is at least 110, preferably within a range of 110–450. When the content of cis-1,4-bond and the average chain length of 1,4-bond are outside the above ranges, respectively, the effect of crystallization by drawing is not obtained, so that the hysteresis loss is not improved, and the object of the invention cannot be achieved.

Furthermore, the Mooney viscosity $ML_{1+4}$ (100° C.) of the polybutadiene rubber is within a range of 20–150, preferably 20–80. When $ML_{1+4}$ (100° C.) is outside the range of 20–150, the balance between the processability and the vulcanizing properties (hysteresis loss, wet skid resistance) cannot be kept.

The polybutadiene to be used in the invention can be preferably produced, for example, by polymerizing butadiene in the presence of a catalyst system consisting of a combination of a compound of lanthanum series rare earth element (abbreviated as Ln compound hereinafter), an organoaluminum compound and Lewis acid and/or Lewis base.

As the Ln compound, use may be made of halogen compounds, carboxylates, alcoholates, thioalcoholates, amides and the like of metals having an atomic number of 57–71. As the organoaluminum compound, there are used ones having a general formula of $AlR_1R_2R_3$, wherein $R_1$, $R_2$ and $R_3$ are the same or different and represent a hydrogen atom or a hydrocarbon residue having a carbon atom of 1–8, respectively. As the Lewis acid, there are used aluminum halides having a general formula of $AlX_nR_{3-n}$, wherein X is a halogen atom, R is a hydrocarbon residue and n is 1, 1.5, 2 or 3, r the other metal halides. The Lewis base is used to dissolve the Ln compound in an organic solvent, and includes, for instance, acetylacetone, ketone and the like.

In the rubber composition according to the invention, the polybutadiene rubber is used in an amount of 10–90% by weight, preferably 20–80% by weight based on 100% by weight of total rubber content. When the amount is less than 10% by weight, the hysteresis loss is not improved, while when the amount exceeds 90% by weight, the wet skid resistance deteriorates undesirably.

In the random styrene-butadiene copolymer rubber according to the invention, the content of bond styrene is not more than 40% by weight, preferably 5–30% by weight, and the content of 1,2-bond in total butadiene unit is 30–95%, preferably 45–95%. This is a copolymer is produced by copolymerizing styrene and butadiene in the presence of an organic alkali metal catalyst (for example, using an organolithium compound as an initiator). The Mooney viscosity ($ML_{1+4}$, 100° C.) is preferable within a range of 20–150. More preferably, use may be made of a copolymer rubber including a branched polymer obtained by subjecting the copolymer having a terminated lithium atom given by the above copolymerization to a coupling reaction with a tin compound (e.g tin halides) or a silicon compound (e.g. silicon halides). The content of the branched polymer is preferably at least 10% by weight. Furthermore, the random styrene-butadiene copolymer rubber is obtained according to a method disclosed in Japanese patent laid-open No. 52-101,287 (a copolymerization method employing a catalyst system of organolithium/anionic surface active agent/Lewis base). Besides, a method disclosed in Japanese patent laid-open No. 57-87,407 can also be applied to the formation of such a random copolymer.

The rubber composition according to the invention may be compounded with additives usually used, such as process oil, carbon black, filler, antioxidant, ozone antidegradant, zinc white, stearic acid, vulcanization accelerator, vulcanizing agent and the like.

A vulcanizate of the rubber composition according to the invention is characterized by having an excellent wet skid resistance and a low hysteresis loss, so that it is preferably used in tire applications, particularly a tread rubber. In addition to the above tire applications, the vulcanizate can also be used as an industrial rubber utilizing the characteristics of the rubber composition according to the invention, for example an industrial belt having good heat resistance and traction.

The following examples are given in illustration of the invention and are not intended as limitations thereof.

The microstructure defined in the invention was measured according to an infrared absorption spectrum method (Morero's method).

The average chain length of 1,4-bond defined in the invention was measured as follows. That is, the polybutadiene according to the invention was completely hydrogenated with p-toluenesulfonyl hydrazide according to a method disclosed by H. J. Harwood in Markromol. Chem., 163, 1 (1973) to obtain a hydrogenation product to be tested. The resulting product was measured by means of an NMR apparatus of FX-100 Model made by Nippon Denshi Kabushiki Kaisha.

Concentration of test sample: 300 mg/2 ml, 1,2,4-trichlorobenzene with perdeuterobenzene, use of 10 mm$\phi$ probe for $^{13}$C-NMR, Carrier frequency: 25.05 MHz, internal lock system,
Flip angle: 45°,
Pulse width: 6 $\mu$sec,
Acquisition time: 5.0 sec,
Spectrum sweep width: 2 KHz,
Measuring temperature: 125° C.,
Internal reference: HMDS,
Number of scan: 110×100 to 190×100 times.

Further, analysis was effected according to a method disclosed by J. C. Randall in J. Polym. Sci., Polymer Physics Edition 13, 1975 (1975).

The wet skid resistance was measured at 25° C. on an indoor asphalt road by means of a skid tester made by Stanley Works. The larger the value, the better the property. The heat build-up was measured as a value of according to Goodrich heat build-up according to ASTM D623/58 (Method A). The lower the value, the better the property.

The hysteresis loss indicating the rolling resistance was calculated from tan $\delta$ measured at 50° C. by means of a viscoelastic spectrometer (made by Rheometrix Corporation, RMS Model). The lower the value, the better the property.

EXAMPLES 1–6

Into an autoclave of 10 l capacity were charged 5.0 kg of cyclohexane, 600 g of toluene and 800 g of 1,3-butadiene in a nitrogen atmosphere and then the temperature was adjusted to 50° C. Separately, a neodymium catalyst system consisting of neodymium octanoate/acetylacetone/triethyl aluminum/diethyl aluminum chloride, which had ratios of neodymium octanoate/acetylacetone = ½ (molar ratio), triethyl aluminum/neodymium octanoate = 50 (molar ratio) and diethyl aluminum chloride/neodymium octanoate = 2.5 (molar ratio), was aged in the presence of a small amount of 1,3-butadiene at 10° C. for 30 minutes, and then charged into the above autoclave so that a ratio of 1,3-butadiene/neodymium octanoate was $1.2 \times 10^4$ (molar ratio), after which the polymerization reaction was conducted. After the completion of the reaction in 3 hours, the degree of conversion was approximately 100%. Then, the polymerization reaction was stopped by adding a solution of 4.8 g of 2,4-di-tert-butyl-p-cresol in 50 ml of methanol. The resulting polymer solution was subjected to a desolvation by steam stripping, and then dried on a hot roll heated at 100° C. to obtain a polybutadiene rubber. The thus obtained polymer had a content of cis-1,4 bond of 90%, an average chain length of 1,4-bond of 180 and a Mooney viscosity (ML$_{1+4}$, 100° C.) of 45.0.

A random styrene-butadiene copolymer rubber as shown in the following Table 1 was obtained as follows:

Into an autoclave of 10 l capacity were charged 5.0 kg of cyclohexane as a solvent and 1.0 kg in total of styrene and 1,3-butadiene as a monomer and further a proper amount of tetrahydrofuran as a randomizing agent and an agent for regulating a content of 1,2-bond in total butadiene unit under a nitrogen atmosphere and then the temperature was adjusted to 40°–50° C. Thereafter, the resulting mixture was polymerized at 40°–50° C. with 0.4 g of n-butyl lithium as an initiator. When the degree of conversion was approximately achieved to 100%, silicon tetrachloride was added as a coupling agent to conduct a coupling reaction. The resulting polymer solution was added with 2,6-di-tert-butyl-p-cresol, subjected to a desolvation by steam stripping and then dried on a hot roll heated at 100° C. to obtain a copolymer rubber.

The vulcanizing properties were evaluated with respect to rubber compositions each containing the polybutadiene rubber and the random styrene-butadiene copolymer rubber polymerized in the presence of the organic alkali metal catalyst as shown in Table 1. In this case, the blending ratio of these compounding rubbers and the properties of vulcanizate are shown in the following Table 3.

A compounding recipe and vulcanizing conditions of the rubber composition are shown in the following Table 2.

As apparent from Table 3, wet skid resistance and the rolling resistance (hysteresis loss) were improved in the rubber compositions according to the invention.

COMPARATIVE EXAMPLE 1

The same procedure as described in Example 1 was repeated, except that the blending ratio of polybutadiene rubber in the composition was less than 10% by weight.

The evaluated results are shown in Table 3, from which it is obvious that the wet skid resistance is good, but the hysteresis loss is not so improved.

COMPARATIVE EXAMPLE 2

The same procedure as described in Example 1 was repeated, except that the blending ratio of polybutadiene rubber in the composition was more than 90% by weight. As seen from Table 3, the hysteresis loss is low, but the wet skid resistance is not so improved.

COMPARATIVE EXAMPLE 3

In this example, only JSR BR01 (made by Japan Synthetic Rubber Co., Ltd., high cis-polybutadiene rubber, content of cis-1,4-bond: 94.9%, average chain length of 1,4-bond: 106) was used as a rubber component. The evaluation for this polymer was performed in the same manner as described in Example 1 to obtain a result as shown in Table 3.

COMPARATIVE EXAMPLE 4

The same procedure as described in Example 2 was repeated, except that 40 parts by weight of BR01 was used instead of 40 parts by weight of polybutadiene rubber.

The resulting vulcanizate is poor in both the wet skid resistance and hysteresis loss.

TABLE 1

Random styrene-butadiene copolymer rubber

|  | Sample-1 | Sample-2 | Sample-3 |
|---|---|---|---|
| Content of bound styrene (%) | 5 | 20 | 15 |
| Content of 1,2-bond (%) | 86 | 60 | 50 |
| Ratio of branched polymer in the copolymer (%) | 45 | 50 | 10 |

TABLE 2

Compounding recipe

|  | Parts by weight |
|---|---|
| Polymer | 100 |
| Carbon black HAF | 50 |
| ZnO | 3 |
| Stearic acid | 2 |
| Antioxidant 810NA*[1] | 1 |
| Vulcanization accelerator MSA*[2] | 1.0 |
| Sulfur | 1.5 |
| Vulcanization temperature | 145° C. |
| Vulcanization time | 40 min. |

*[1]N—phenyl-N'—isopropyl-p-phenylenediamine
*[2]N—oxydiethylene-2-benzothiazolylsulfenamide

TABLE 3

|  | Example | | | | | | Comparative Example | | | |
|---|---|---|---|---|---|---|---|---|---|---|
|  | 1 | 2 | 3 | 4 | 5 | 6 | 1 | 2 | 3 | 4 |
| Blending ratio*[1] | | | | | | | | | | |
| Polybutadiene rubber of the invention | 20 | 40 | 60 | 80 | 60 | 60 | 5 | 95 | — | — |
| Random styrene-butadiene copolymer rubber | 80 (Sample-1) | 60 (Sample-1) | 40 (Sample-1) | 20 (Sample-1) | 40 (Sample-2) | 40 (Sample-3) | 95 (Sample-1) | 5 (Sample-1) | — | 60 (Sample-1) |
| JSR BR01 | — | — | — | — | — | — | — | — | 100 | 40 |
| Properties of vulcanizate | | | | | | | | | | |
| Wet skid resistance | 60 | 60 | 59 | 55 | 59 | 59 | 60 | 48 | 35 | 38 |
| Hysteresis loss tan δ (50° C.) | 0.110 | 0.106 | 0.102 | 0.100 | 0.103 | 0.107 | 0.131 | 0.100 | 0.136 | 0.138 |
| Goodrich heat build-up (°C.) | 22 | 22 | 22 | 22 | 22 | 22 | 21 | 22 | 23 | 22 |

Note
*[1]Parts by weight based on 100 parts by weight of total rubber content

What is claimed is:

1. A rubber composition comprising (A) 10–90% by weight of polybutadiene rubber having a content of cis-1,4-bond of at least 80% and an average chain length of cis-1,4-bond of not less than 110, and (B) 10–90% by weight of random styrene-butadiene copolymer rubber obtained by copolymerization in the presence of an organic metal catalyst and having a content of bound styrene of not more than 40% by weight and a content of 1,2-bond in the total butadiene unit of 30–95%.

2. A rubber composition according to claim 1, wherein said average chain length of cis-1,4-bond is 110–450.

3. A rubber composition according to claim 1, wherein said polybutadiene has a Mooney viscosity ($ML_{1+4}$, 100° C.) of 20–150.

4. A rubber composition according to claim 1, wherein said rubber composition contains 20–80% by weight of said polybutadiene rubber.

5. A rubber composition according to claim 1, wherein said content of bound styrene is 5–30% by weight.

6. A rubber composition according to claim 1, wherein said content of 1,2-bond in the total butadiene unit is 45–95%.

7. A rubber composition according to claim 1, wherein said random styrene-butadiene copolymer rubber has a Mooney viscosity ($ML_{14}$, 100° C.) of 20–150.

8. A rubber composition according to claim 1, wherein said copolymer rubber contains at least 10% by weight of a branched polymer obtained by subjecting the copolymer having a terminated lithium atom to a coupling reaction with a tin compound or a silicon compound.

9. A rubber composition according to claim 1, wherein said polybutadiene has a Mooney viscosity ($ML_{1+4}$, 100° C.) of 20–80.

* * * * *